(12) United States Patent
Chapin et al.

(10) Patent No.: US 8,977,609 B1
(45) Date of Patent: Mar. 10, 2015

(54) PROVIDING A SEARCH RESULT BASED ON AN INPUT INCLUDING A TIME SPECIFICATION

(75) Inventors: Charles Chapin, San Jose, CA (US); Tao Huang, Cupertino, CA (US); Xinyu Tang, Cupertino, CA (US)

(73) Assignee: Google Inc., Mountain View, CA (US)

( * ) Notice: Subject to any disclaimer, the term of this patent is extended or adjusted under 35 U.S.C. 154(b) by 57 days.

(21) Appl. No.: 13/620,059

(22) Filed: Sep. 14, 2012

(51) Int. Cl.
*G06F 17/30* (2006.01)
*G06F 7/00* (2006.01)

(52) U.S. Cl.
CPC .... *G06F 17/30867* (2013.01); *G06F 17/30864* (2013.01)
USPC ......................................................... 707/722

(58) Field of Classification Search
CPC ................... G06F 17/30864; G06F 17/30867; G06F 17/30696
USPC .......................................................... 707/722
See application file for complete search history.

(56) References Cited

U.S. PATENT DOCUMENTS

| 8,473,497 B2* | 6/2013 | Schuil et al. ................... 707/748 |
| 2007/0041666 A1* | 2/2007 | Nagamine et al. ............. 382/305 |
| 2011/0173193 A1* | 7/2011 | Ahn et al. ....................... 707/725 |
| 2012/0109637 A1* | 5/2012 | Merugu et al. ..................... 704/9 |
| 2012/0215640 A1* | 8/2012 | Ramer et al. ............... 705/14.55 |

* cited by examiner

*Primary Examiner* — Kuen Lu
(74) *Attorney, Agent, or Firm* — Dority & Manning P.A.

(57) ABSTRACT

Systems and methods for providing a search result are provided. In some aspects, a method includes receiving a query. The method also includes providing a first set of search results responsive to the query. The method also includes receiving a selected search result in the first set of search results. The method also includes determining a time specification based on the selected search result. The method also includes providing a second set of search results responsive to the query and the time specification.

17 Claims, 6 Drawing Sheets

PROVIDING A SEARCH RESULT BASED ON AN INPUT INCLUDING A TIME SPECIFICATION

FIELD

The subject technology generally relates to data repository or Internet search and, in particular, relates to providing a search result based on an input including a time specification.

BACKGROUND

Typically, a search engine may operate by receiving a text query, determining tags based on the text of the query, and providing results associated with the tags. Such text and tag based searches are useful for looking up data in an index. However, other search techniques may be desirable.

SUMMARY

The disclosed subject matter relates to a computer-implemented method for providing a search result. The method includes receiving a query. The method also includes providing a first set of search results responsive to the query. The method also includes receiving a selected search result in the first set of search results. The method also includes determining a time specification based on the selected search result. The method also includes providing a second set of search results responsive to the query and the time specification.

The disclosed subject matter further relates to a non-transitory computer-readable medium. The computer-readable medium includes instructions that, when executed by a computer, cause the computer to implement a method for providing a search result. The instructions include code for receiving a query. The instructions also include code for providing a first set of search results responsive to the query. The instructions also include code for receiving a selected subset of the first set of search results. The instructions also include code for determining a time specification based on the selected subset of the first set of search result. The instructions also include code for providing a second set of search results responsive to the query and the time specification.

The disclosed subject matter further relates to a system. The system includes one or more processors. The system also includes a memory. The memory includes instructions that, when executed by a computer, cause the computer to implement a method for providing a search result. The instructions include code for receiving a query. The instructions also include code for providing a set of search results responsive to the query. The instructions also include code for receiving a selected search result in the set of search results. The instructions also include code for determining a time specification based on the selected search result. The instructions also include code for providing a subset of the set of search results responsive to the query and the time specification.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

It is possible for a search input to request information within a time domain. For example, a user might search for the query: "February travel." Text and tag based searching may not be optimal for processing this query because, while data items that include the tags "travel" and "February," may be provided, other relevant results, such as those tagged with "travel" and "winter," or "travel" and "Valentine's Day" may not be provided. Thus, the user might not be able to obtain some relevant information related to the query. As the foregoing illustrates, approaches for providing search results based on indications of time may be desirable.

The subject technology relates to techniques for providing a search result. A server may receive a query, for example, a text or image query from a client computing device entered by a user of the client computing device. The server may provide a first set of search results responsive to the query. The first set of search results may include web pages, text, images, audio, or video. The server may receive a selected search result in the first set of search results. The selected search result may be selected by a user of the client computing device. The server may determine a time specification, i.e., an indication of a time period, based on the selected search result. For example, if the selected search result includes a photograph of New York City covered with snow, the time specification "winter" may be determined. The server may provide a second set of search results responsive to the query and the time specification. All or a portion of the second set of search results may be displayed on the client computing device.

Figure 1:
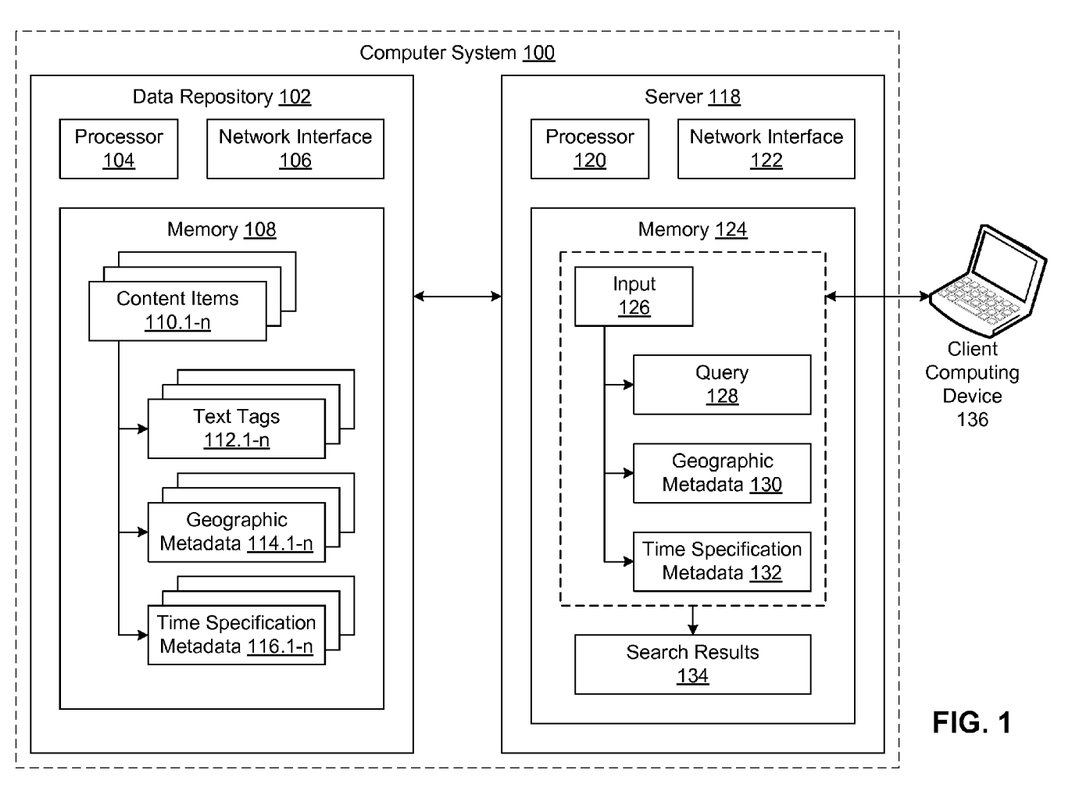
FIG. 1 illustrates an example of a computer system configured to provide a search result based on an input including a time specification.

FIG. 1 illustrates an example of a computer system 100 configured to provide a search result based on an input including a time specification.

As shown, the computer system 100 includes a data repository 102 and a server 118. The computer system 100 may be coupled with a client computing device 136. The data repository 102, server 118, and client computing device 136 may communicate with one another over a network, e.g., the Internet or a cellular network. While only one data repository 102, server 118, and client computing device 136 are illustrated, the subject technology may be implemented with one or more data repositorys 102, servers 118, or client computing devices 136. Alternatively, a single machine may implement the functionalities of two or more of the data repository 102, the server 118, or the client computing device 136.

As shown, the data repository 102 includes a processor 104, a network interface 106, and a memory 108. The processor 104 is configured to execute computer instructions that are stored in a computer-readable medium, for example, the memory 108. The processor 104 may be a central processing unit (CPU). The network interface 106 is configured to allow the data repository 102 to transmit and receive data in a network. The network interface 106 may include one or more network interface cards (NICs). The memory 108 is configured to store data and instructions. As shown, the memory 108 includes a set of content items 110. The content items 110 are associated with text tags 112, geographic metadata 114, and time specification metadata 116. The data repository 102 may be implemented as a database or any other data store.

The content items 110.1-n may include content that may be stored in data repository 102, for example, files including one or more web page, image, video, text, or audio. An example content item 110.1 may be a photograph of a Christmas tree and an ice skating rink outside the Rockefeller Center on a snowy evening in New York City.

Each content item 110 may be associated with one or more text tags 112.1-n. The text tags may include descriptions of the content item. For example, photograph content item 110.1, described above, may be associated with the text tags 112.1 "Christmas," "Christmas tree," "ice skating," "Rockefeller Center," or "New York City."

Each content item 110 may also be associated with one or more geographic metadata 114 that describe a location associated with the content item 110. For example, photograph content item 110.1, described above, may be associated with the geographic metadata 114.1 "New York City," "Rockefeller Center," the address of the Rockefeller Center, or the latitude and longitude of the geographic location where the photograph was taken. The geographic metadata may be associated with the photograph by a camera taking the photograph or derived from the photograph by a server (e.g., server 118) upon placing the photograph in a data repository (e.g., data repository 102).

Each content item 110 may also be associated with one or more time specification metadata 116. The time specification metadata 116 may describe a time specification associated with the content item 110. Example time specification metadata may include indications of single interval time specifications, recurring interval time specifications, and topical time specifications. A single interval time specification may include a time range between a starting point and an ending point, for example, "January 2011" refers to the time range beginning at 00:00 on Jan. 1, 2011 and finishing at 23:59 on Jan. 31, 2011. Recurring interval time specifications may include multiple single interval time specifications that may not intersect, for example, "January" or "Friday." Topical time specifications may include less strictly defined time specifications based on a subject or an activity, for example, "spring break," or "duck hunting season." For example, photograph content item 110.1, described above, may be associated with the time specification metadata 116.1 "evening," "winter," "December," "Christmas-time," or a year or date when the photograph was taken. The time specification metadata 116.1 may be associated with the photograph content item 110.1 by a camera taking the photograph (e.g., the camera may store the time when the photograph was taken in association with the photograph) or derived from the photograph by a server (e.g., server 118) upon placing the photograph in a data repository (e.g., data repository 102).

As shown, the server 118 includes a processor 120, a network interface 122, and a memory 124. The processor 120 is configured to execute computer instructions that are stored in a computer-readable medium, for example, the memory 124. The processor 120 may be a central processing unit (CPU). The network interface 122 is configured to allow the server 118 to transmit and receive data in a network. The network interface 122 may include one or more network interface cards (NICs). The memory 124 is configured to store data and instructions. As shown, the memory 124 includes an input 126, a query 128, geographic metadata 130, time specification metadata 132, and search results 134. The server 118 may be implemented as a single machine or as multiple machines with a single processor or with multiple processors. For example, the server 118 may be a server farm.

The input 126 may include the query 128, the geographic metadata 130, or the time specification metadata 132 or information based on which the query 128, the geographic metadata 130, or the time specification metadata 132 may be derived. For example, the query may be a string, e.g., "Lake Tahoe, Calif. summer lodging," from which the query 128, "Lake Tahoe, Calif. summer lodging," the geographic metadata 130, "Lake Tahoe, Calif.," and the time specification metadata 132, "summer," may be derived. Alternatively, the input 126 may include a text or image query 128 that does not include geographic or time information, and the geographic metadata 130 or time specification metadata 132 may be derived from other information. For example, a user may enter a query for "restaurant," from a computing device (e.g., client computing device 136) located in San Francisco, Calif. at 7 AM on a Saturday morning. The geographic metadata 130 may correspond to the location of the computing device, and the time specification metadata 132 may correspond to the time when the query was entered by the user or received by the server 118. In the example, the geographic metadata 130 may be San Francisco, Calif., and the time specification metadata 132 may be 7 AM on Saturday morning. As a result, the search results 134 may include restaurants in San Francisco that are open on Saturday mornings and serve breakfast.

In one example, the input 126 may include a query 128. The server 118 may generate a first set of search results 134 responsive to the query. The user may indicate a selection of one or more search results from the first set of search results, and the server may determine the time specification metadata 132 based on the search results selected by the user. For example, the user may enter a query 128 for "Lake Tahoe images." After receiving the query 128, the server may provide a set of search results. The user may select a subset of interest of the set of search results. The server may determine the time specification metadata 132 based on the subset of interest. For example, if the subset of interest includes images of Lake Tahoe covered in snow and ice, the time specification metadata 132 of winter may be determined.

The set of search results 134 may include search results responsive to the input 126. The set of search results may include web pages, text, audio, video, or image information. The set of search results 134 may be selected from the content items 110.1-*n* in the data repository 102 based on the text tags 112.1-*n*, the geographic metadata 114.1-*n*, or the time specification metadata 116.1-*n* associated with the content items 110.1-*n* in the data repository 102.

The client computing device 136 may be any computing device capable of interacting with a user, for example, by providing a specialized search application or a web browser configured to run a search via a web page. The client computing device 136 may be a laptop computer, a desktop computer, a mobile phone, a television with one or more processors embedded therein and/or coupled thereto, a personal digital assistant (PDA), a tablet computer, a netbook, a physical machine, or a virtual machine. The client computing device 136 may include one or more of a keyboard, a mouse, a display, and/or a touch screen. Persons skilled in the art will recognize other devices that could implement the functionalities of the client computing device 136 and other components that may be included in the client computing device 136.

Figure 2:
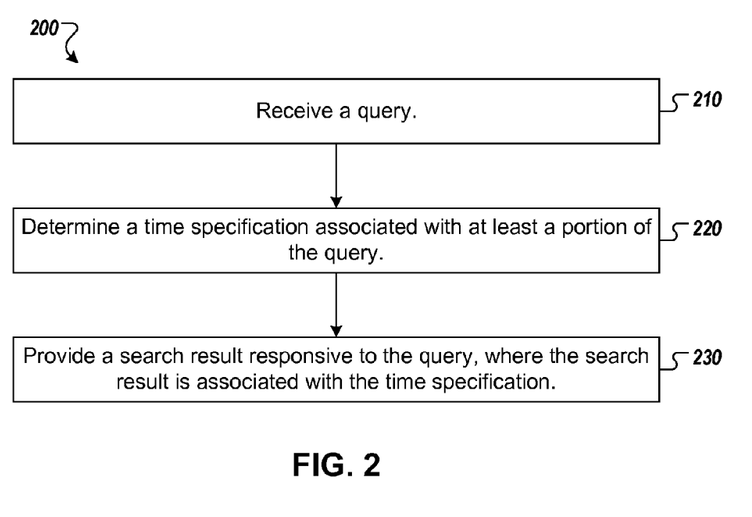
FIG. 2 illustrates an example process by which a search result based on an input including a time specification may be provided.

FIG. 2 illustrates an example process 200 by which a search result based on an input including a time specification may be provided.

The process 200 begins at block 210, where the server (e.g. server 118) receives a query. The query may be a text query, an image query, or any other type of query. The query may be transmitted to the server from a client computing device (e.g. client computing device 136).

In block 220, the server determines a time specification associated with at least a portion of the query. The time specification may be a single interval time specification, a recurring interval time specification, or a topical time specification. A single interval time specification may include a time range between a starting point and an ending point, for example, "January 2011" refers to the time range beginning at 00:00 on Jan. 1, 2011 and finishing at 23:59 on Jan. 31, 2011. Recurring interval time specifications may include multiple single interval time specifications that may not intersect, for example, "January" or "Friday." Topical time specifications may include less strictly defined time specifications based on a subject or an activity, for example, "spring break," or "duck hunting season."

In one example, the query may include a time specification. For example, the query "duck hunting season camping in Montana," includes the time specification "duck hunting season." Alternatively, the time specification may include the current time, i.e., the time when a user entered the query on the client computing device or the time when the query was received on the server. For example, a query for "coffee house" entered via a client computing device located in Los Angeles, Calif. at 1 AM on Tuesday morning may be associated with a time specification of 1 AM on Tuesday morning and may generate search results that include coffee houses that are open at 1 AM on Tuesday morning. The location of the client computing device may be detected via GPS technology or via a cellular, wireless, or wired network to which the client computing device is connected and transmitted to the server in conjunction with the query. However, the user of the client computing device may opt out of having the location of the client computing device transmitted to the server in conjunction with the query.

In an alternative example, the query may not include a time specification. The server may provide a plurality of search results responsive to the query. In response to the plurality of search results, the server may receive a selection of one or more search results in the plurality of search results. The server may determine a time specification based on the selection of the search results in the plurality of search results.

In block 230, the server provides a search results responsive to the query. The search result may be associated with the time specification. The server may provide a single search result or multiple search results. The search result may include an advertisement, e.g., for a product or service associated with the query or with the time specification. The advertisement may be associated with metadata indicating at least a portion of the time specification. For example, if Lake Tahoe is a well-known winter ski destination in northern California and a user enters a search for "Lake Tahoe," with a time specification of winter, an advertisement for skis may be presented to the user. The metadata indication the portion of the time specification may be automatically generated by the server or provided by a creator of the advertisement. In one implementation, the query may include or be associated with a geographic indication, and the search result may also be associated with the geographic indication. After block 230, the process 200 ends.

Figure 3:
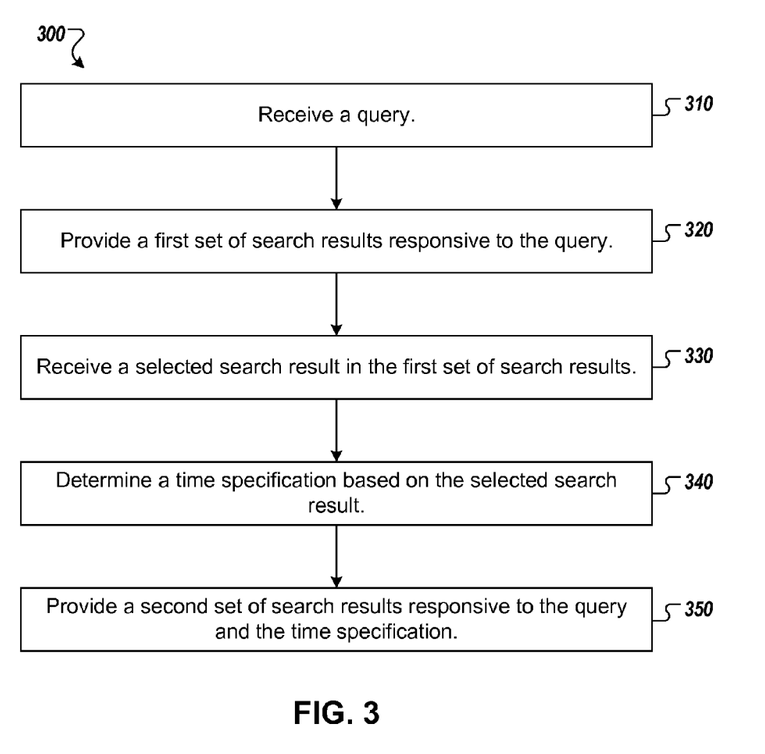
FIG. 3 illustrates an example process by which a set of search results based on an input including a time specification may be provided.

FIG. 3 illustrates an example process 300 by which a set of search results based on an input including a time specification may be provided.

In block 310, the server (e.g., server 118) receives a query. The query may be a text query, an image query, or any other type of query. The query may be transmitted to the server from a client computing device (e.g. client computing device 136).

In block 320, the server provides a first set of search results responsive to the query. The query may include a geographic indication, e.g. "New York City," "Montana," "college towns," or "spring break resorts," and the first set of search results may be associated with the geographic indication.

In block 330, the server receives a selected search result from the first set of search results. For example, a user of a client computing device (e.g., client computing device 136) may select one or more search results, e.g., by highlighting the search results, touching the search results on a touch screen, or clicking the search results with a mouse. In one implementation, the user may select a subset of the first set of search results that may include one or more search results from the first set of search results.

In block 340, the server determines a time specification based on the selected search result. The time specification may be a single interval time specification, a recurring interval time specification, or a topical time specification. A single interval time specification may include a time range between a starting point and an ending point, for example, "January 2011" refers to the time range beginning at 00:00 on Jan. 1, 2011 and finishing at 23:59 on Jan. 31, 2011. Recurring interval time specifications may include multiple single interval time specifications that may not intersect, for example, "January" or "Friday." Topical time specifications may include less strictly defined time specifications based on a subject or an activity, for example, "spring break," or "duck hunting season."

The time specification may be associated with the selected search result. For example, the selected search result may be associated with a tag indicating the time specification. The time specification may be selected from a stored set of time specifications. For example, a stored set of time specifications may include the seven days of the week, the twelve months, or the four seasons. The selected search result may include an image, and the time specification may be determined based on a time depicted in the image. For example, a photograph may include a group of people sunbathing and swimming in Lake Tahoe, and the time specification "summer" may be associated with the photograph based on a likely time period depicted in the photograph. The selected search result may include metadata, and the server may detect the time specification that corresponds to the metadata of the selected search result from the set of time specifications. The metadata may include one or more of the text of the selected search result, images depicted in the selected search result, or a time of creation of the selected search result.

In one implementation, the user may select a subset of the first set of search results that may include one or more search results from the first set of search results. The time specification may be determined based on at least one search result in the selected subset of the first set of search results or based on each search result in the selected subset of the first set of search results.

In block 350, the server provides a second set of search results responsive to the query and the time specification. The server may transmit the second set of search results for display to the client computing device. The second set of search results may be a subset of the first set of search results. The second set of search results may include one or more advertisements. The one or more advertisements may include metadata indicating at least a portion of the time specification. For example, in response to a search for Lake Tahoe that includes the time specification "summer," an annual Lake Tahoe event that takes place in August may be advertised. After block 350, the process 300 ends.

Figure 4:
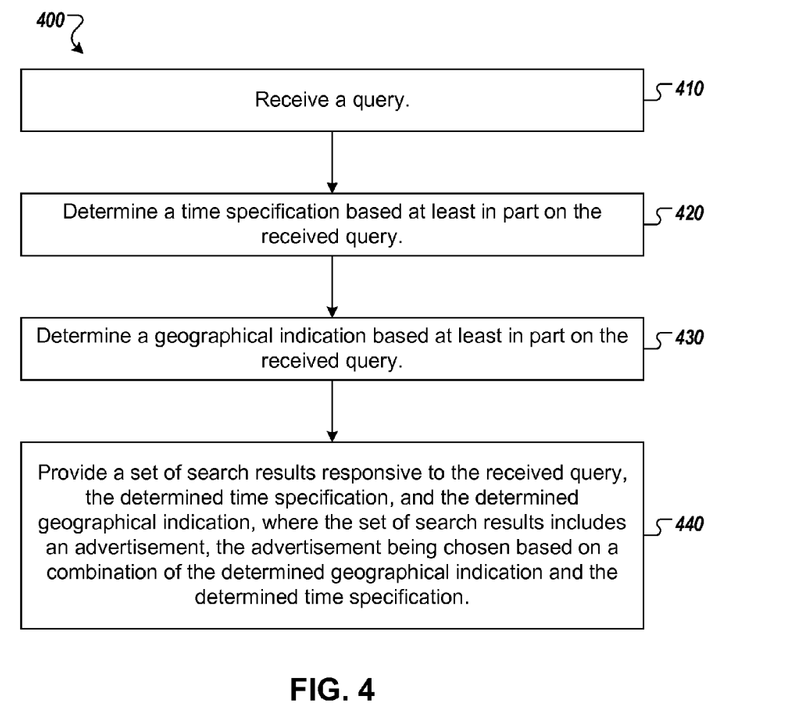
FIG. 4 illustrates an example process by which a set of search results based on a time specification and a geographical indication may be provided.

FIG. 4 illustrates an example process 400 by which a set of search results based on a time specification and a geographical indication may be provided.

In block 410, a server (e.g., server 118) receives a query. The query may be entered on a client computing device (e.g., client computing device 136) and provided to the server via a network. The query may include text, image(s), audio, or video. In one aspect, the query includes the text, "spring break drinks served of Jamaica."

In block 420, the server determines a time specification based at least in part on the received query. For example, if the query includes the text, "spring break drinks served in Jamaica," the time specification may be "spring break." "Spring break" is a topical time specification as the time specification is less strictly defined based on a subject or an activity. Alternatively, the time specification can correspond to a time when the query was entered at the client computing device or a time when the query was received at the server. For example, a query for "coffee shop" entered at 2 AM on Tuesday morning may be associated with the time specification 2 AM on Tuesday morning.

In block 430, the server determines a geographical indication based at least in part on the received query. For example, if the query includes the text, "spring break drinks served in Jamaica," the geographical indication may be "Jamaica." Alternatively, if the geographic location of the client computing device is known to the server, the geographical indication may correspond to the geographic location of the client computing device. For example, if a query for "coffee shop" is provided from a client computing device in Los Angeles, Calif., the geographical indication of "Los Angeles, Calif.," may be associated with the query. The user of the client computing device must affirmatively provide permission to share the location of the client computing device and a user interface element on the client computing device (e.g., a blue dot indicating location tracking) indicates that the geographic location of the client computing device is being transmitted over a network.

In block 440, the server provides a set of search results responsive to the received query, the determined time specification, and the determined geographical indication. The set of search results includes an advertisement. The advertisement is chosen based on a combination of the determined geographical indication and the determined time specification. After block 440, the process 400 ends.

Figure 5:
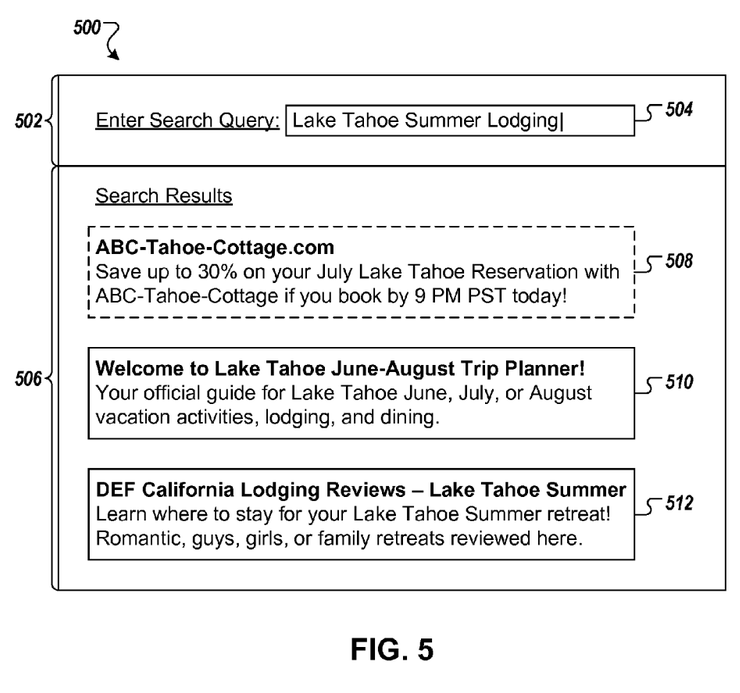
FIG. 5 illustrates an example interface for providing search results including an advertisement chosen based on a geographical indication and a time specification.

FIG. 5 illustrates an example interface 500 for providing search results including an advertisement chosen based on a geographical indication and a time specification.

The interface 500 may be provided via an application executing on a client computing device (e.g., client computing device 136), for example, a browser or a special purpose application executing on a mobile phone or tablet computer. As shown, the interface 500 includes an input region 502 and a search results region 506.

The input region 502 includes an input box 504 for entering a search query. As shown, the user has entered "Lake Tahoe Summer Lodging," in the input box 504.

The search results region 506 includes search results 508, 510, and 512. While three search results 508, 510, and 512 are illustrated, the subject technology may be implemented with any number of search results.

The search results include an advertisement 508 and generic search results 510 and 512. The advertisement 508 may be illustrated differently from the generic search result 510 and 512. As shown, there are dashed lines around the advertisement 508, while there are solid liens around the generic search results 510 and 512. In alternative implementations, the advertisement 508 may be in a different color (e.g., yellow) or in a different position of the interface 500 (e.g., at the right hand side) than the generic search results 510 and 512.

The advertisement 508 is chosen based on a geographical indication ("Lake Tahoe") and a time specification ("summer," which includes the month of July) in the query entered in the input box 504. However, as shown, the advertisement 508 does not include the word "summer." Instead, the advertisement 508 includes the word "July," which is a month in the summer and, thus, corresponds to the time specification "summer" in the query entered in input box 504. The generic search result 510 similarly includes the words "June," "July," and "August," but not the word "summer." However, the generic search result 512 includes the word "summer."

Figure 6:
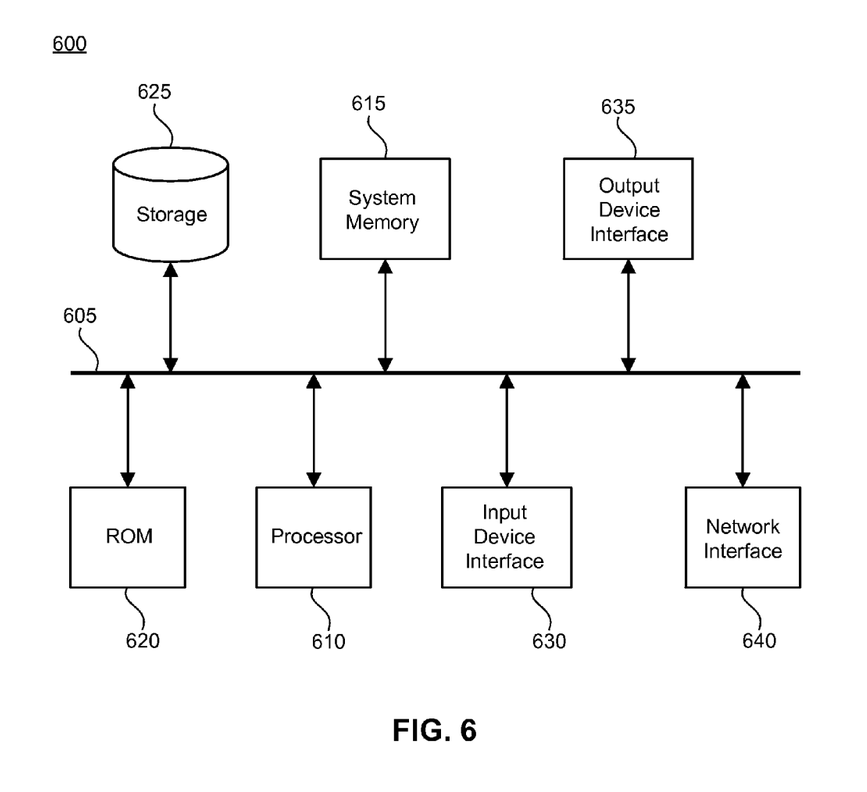
FIG. 6 conceptually illustrates an example electronic system with which some implementations of the subject technology are implemented.

FIG. 6 conceptually illustrates an electronic system 600 with which some implementations of the subject technology are implemented. For example, one or more of the data repository 102, the server 118, or the client computing device 136 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for providing a search result based on an input including a time specification in accordance with some implementations. From these various memory units, the processing unit (s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touchscreen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps or blocks in the processes disclosed is an illustration of example approaches. Based upon design preferences, it is understood that the specific order or hierarchy of steps or blocks in the processes may be rearranged, or that all illustrated steps or blocks be performed. Some of the steps or blocks may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for providing a search result, the method comprising:
    receiving, using one or more computing devices, a query;
    providing, using the one or more computing devices, a first set of search results responsive to the query;
    receiving, using the one or more computing devices, a user selected search result in the first set of search results;
    determining, using the one or more computing devices, a time specification based on metadata of the user selected search result,
    wherein determining a time specification based on the metadata of the user selected search result comprises
        determining a time specification associated with the user selected search result and
        selecting the time specification from a stored set of time specifications; and
    providing, using the one or more computing devices, a second set of search results responsive to the query and the determined time specification.

2. The method of claim 1, further comprising:
    determining a geographical indication based at least in part on the received query.

3. The method of claim 2, wherein the second set of search result comprises an advertisement chosen at least in part based on a combination of the determined geographical indication and the determined time specification.

4. The method of claim 1, wherein the time specification comprises a single interval time specification, a recurring interval time specification, or a topical time specification.

5. The method of claim 1, wherein the user selected search result comprises an image, and wherein the method further comprises determining the time specification based at least in part on a time depicted in the image.

6. The method of claim 1, wherein the second set of search results is a subset of the first set of search results.

7. A non-transitory computer-readable medium for providing a search result, the computer-readable medium comprising instructions that, when executed by a computer, cause the computer to implement a method, the method comprising:

receiving a query;
providing a first set of search results responsive to the query;
receiving a user selected subset of the first set of search results;
determining a time specification based on metadata of the user selected subset of the first set of search results,
wherein determining a time specification based on the metadata of the user selected search result comprises
determining a time specification associated with the user selected search result and
selecting the time specification from a stored set of time specifications; and
providing a second set of search results responsive to the query and the determined time specification.

8. The computer-readable medium of claim 7, wherein the method further comprises:
determining a geographical indication based at least in part on the received query.

9. The computer-readable medium of claim 8, wherein the second set of search result comprises an advertisement chosen at least in part based on a combination of the determined geographical indication and the determined time specification.

10. The computer-readable medium of claim 7, wherein determining the time specification based on the user selected subset of the first set of search result comprises:
determining the time specification based on at least one search result in the user selected subset of the first set of search results.

11. The computer-readable medium of claim 7, wherein determining the time specification based on the user selected subset of the first set of search result comprises:
determining the time specification based on each search result in the user selected subset of the first set of search results.

12. A system comprising:
one or more processors; and
a memory comprising instructions that, when executed by the one or more processors, cause the one or more processors to implement a method, the method comprising:
receiving a query,
providing a set of search results responsive to the query,
receiving a user selected search result in the set of search results,
wherein the user selected search result comprises an image, determining a time specification based on metadata of the user selected search result,
wherein determining a time specification based on the metadata of the user selected search result comprises determining a time specification associated with the user selected search result,
wherein determining the time specification is based, at least in part, on a time depicted in the image, and
providing a subset of the set of search results responsive to the query and the determined time specification.

13. The system of claim 12, wherein the method further comprises:
determining a geographical indication based at least in part on the received query.

14. The system of claim 13, wherein the second set of search result comprises an advertisement chosen at least in part based on a combination of the determined geographical indication and the determined time specification.

15. The system of claim 12, wherein the time specification comprises a single interval time specification, a recurring interval time specification, or a topical time specification.

16. The system of claim 12, wherein providing the subset of the set of search results responsive to the query and the determined time specification comprises:
detecting additional search results from the set of search results that have metadata corresponding to the metadata of the user selected search result.

17. The system of claim 12, wherein the metadata of the user selected search result comprises one or more of text in the user selected search result, images depicted in the user selected search result, or a time of creation of the user selected search result.

* * * * *